(12) United States Patent
Lagerstedt et al.

(10) Patent No.: US 7,933,609 B2
(45) Date of Patent: Apr. 26, 2011

(54) TRACKING A GROUP OF MOBILE TERMINALS

(75) Inventors: Anna-Maria Lagerstedt, Lund (SE); Eral Denis Foxenland, Malmo (SE); Randi-Lise Hjelmeland Almas, Malmo (SE); Lisa Wiveca Lindahl, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 453 days.

(21) Appl. No.: 11/675,736

(22) Filed: Feb. 16, 2007

(65) Prior Publication Data

US 2008/0200189 A1    Aug. 21, 2008

(51) Int. Cl.
*H04W 24/00* (2009.01)

(52) U.S. Cl. ............... 455/456.1; 455/456.3; 455/456.6; 455/457; 455/461; 455/419

(58) Field of Classification Search .......... 455/456, 455/419, 457, 461
See application file for complete search history.

(56) References Cited

U.S. PATENT DOCUMENTS

| | | | |
|---|---|---|---|
| 6,462,708 B1 * | 10/2002 | Tsujimoto et al. ....... | 342/357.43 |
| 6,577,946 B2 * | 6/2003 | Myr .............................. | 701/117 |
| 6,993,350 B2 * | 1/2006 | Katoh ............................. | 455/457 |
| 7,236,799 B2 * | 6/2007 | Wilson et al. ............... | 455/456.3 |
| 7,310,534 B2 * | 12/2007 | Northcutt .................... | 455/456.6 |
| 7,355,995 B2 * | 4/2008 | Ogino et al. .................. | 370/328 |
| 2003/0008670 A1 | 1/2003 | Katoh | |
| 2004/0192350 A1 * | 9/2004 | Pelaez et al. ............... | 455/456.3 |
| 2005/0144049 A1 * | 6/2005 | Kuzunuki et al. .................. | 705/6 |
| 2005/0164715 A1 * | 7/2005 | Kawamoto ..................... | 455/457 |
| 2005/0288036 A1 * | 12/2005 | Brewer et al. ............. | 455/456.2 |
| 2008/0039121 A1 * | 2/2008 | Muller et al. .............. | 455/456.3 |
| 2008/0225756 A1 * | 9/2008 | Amann et al. ................ | 370/260 |

OTHER PUBLICATIONS

International Search Report and Written Opinion dated May 19, 2008 issued in corresponding PCT application No. PCT/IB2007/053254, 15 pages.

Notification of Transmittal of the International Preliminary Report on Patentability corresponding to PCT/IB2007/053254, dated Apr. 30, 2009, 10 pages.

* cited by examiner

*Primary Examiner* — Huy Phan
*Assistant Examiner* — Sowmini Nair
(74) *Attorney, Agent, or Firm* — Harrity & Harrity, LLP

(57) ABSTRACT

A method performed by a mobile terminal may include identifying a group of mobile terminals, generating a message that includes a link to a map showing a position each of the mobile terminals in the group and transmitting the message to each of the plurality of mobile terminals in the group.

18 Claims, 12 Drawing Sheets

FIG. 5

| 510 | 520 | 530 |
|---|---|---|
| ANNA-MARIA | 555-555-0137 | GROUP |
| BETH | 555-555-6789 | |
| BRIAN | 555-555-7890 | |
| CHRIS | 555-555-2365 | |
| CINDY | 555-555-3456 | |
| DENIS | 555-555-4567 | |
| ERAL | 555-555-1234 | GROUP |
| FRANK | 555-555-2345 | |
| GLENN | 555-555-8901 | |
| HARVEY | 555-555-1236 | |
| HILLARY | 555-555-0117 | |
| HOT JEFF | 555-555-1345 | |
| HOME | 555-555-1234 | |
| INGRID | 555-555-4232 | |
| JUDY | 555-555-2345 | |
| JULIE | 555-555-2345 | |
| LISA | 555-555-6968 | GROUP |
| LISERAND | 555-555-9812 | |
| SUPER DAVE | 555-555-5555 | |
| WOODY | 555-555-9994 | |

500

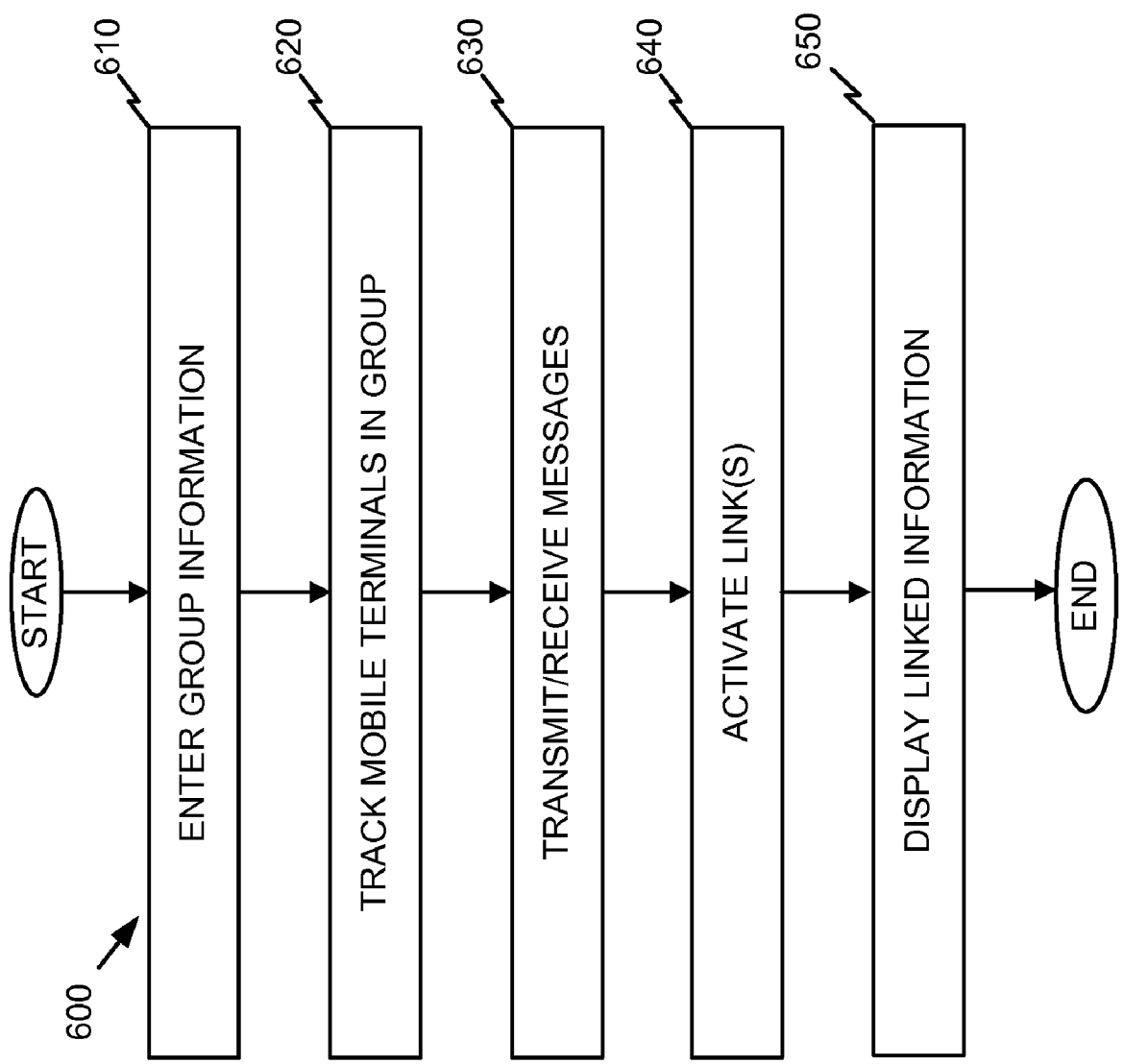

TRACKING A GROUP OF MOBILE TERMINALS

TECHNICAL FIELD OF THE INVENTION

Systems and methods described herein generally relate to communications devices and, more particularly, to tracking the position of communications devices.

DESCRIPTION OF RELATED ART

Communication devices, such as cellular telephones, have become increasingly versatile. For example, cellular telephones often include Global Positioning System (GPS) tracking features that enable users to monitor their position. At the present time, GPS features employed on cellular telephones and portable communications devices are limited to tracking a position of the device itself.

SUMMARY

According to one aspect, a method comprises transmitting information identifying a position of a mobile terminal; transmitting information identifying a destination address; and receiving and displaying a message that includes a map including the position of the mobile terminal and the destination address.

Additionally, the method further comprises inputting information identifying a group of mobile terminals.

Additionally, the method further comprises receiving and displaying a map that includes the position of each of the group of mobile terminals.

Additionally, the received and displayed message includes text.

Additionally, the received and displayed message is transmitted from another mobile terminal.

According to another aspect, a mobile terminal is provided. The mobile terminal comprises: an input device for entering information identifying a mobile terminal and a destination address; a display; and logic configured to: transmit a signal indicating a position of the identified mobile terminal, transmit the destination address, receive a message that includes a map of the position of the mobile terminal and the destination address, and control the display to display the received map.

Additionally, the logic may be configured to receive information from the input device that identifies a group of mobile terminals.

Additionally, the logic may be further configured to store the information that identifies the group of mobile terminals in a contact list.

Additionally, the logic may be further configured to transmit a text message to each one of the mobile terminals in the identified group of mobile terminals.

Additionally, the logic may be further configured to receive and display a message that includes a map showing the position of each of the mobile terminals in the identified group.

According to another aspect, a method is provided. The method comprises: identifying a group of mobile terminals; generating a message that includes a map showing a position of each of the mobile terminals in the group or a link to the map showing the position of each of the mobile terminals in the group; and transmitting the message to each of the plurality of mobile terminals in the group.

Additionally, the method further comprises identifying a destination address of the group of mobile terminals, wherein the map shows the position of the destination address.

Additionally, the message further includes directions to the destination address or provides a link to the directions.

Additionally, the message further includes links related to the destination address.

Additionally, the method further comprises activating the link; and displaying the map showing a position each of the mobile terminals in the group.

According to another aspect, a method is provided. The method comprises receiving signals relating to positions of each of a plurality of mobile terminals; receiving a destination address for the plurality of mobile terminals; generating a map that shows the position of each of the plurality of mobile terminals based on the received signals from each of the plurality of mobile terminals and the destination address; and transmitting the generated map to each of the plurality of mobile terminals.

Additionally, the method further comprises receiving information identifying each of the plurality of mobile terminals.

Additionally, the method further comprises calculating the position of each of the identified plurality of mobile terminals based on the received signals from each of the plurality of mobile terminals.

Additionally, the method further comprises generating directions to the destination address based on the calculated position of each of the plurality of mobile terminals and a position of the destination address.

Additionally, the method further comprises automatically sending a message to a mobile terminal based on a distance between the calculated position of the mobile terminal and the destination address.

Other features and advantages of the systems and methods described herein will become readily apparent to those skilled in this art from the following detailed description. The implementations shown and described provide illustration of the best mode contemplated for carrying out the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 5 illustrates an exemplary contact list;

FIG. 6 is a flow diagram illustrating exemplary processing by the system; and

DETAILED DESCRIPTION

The following detailed description refers to the accompanying drawings. The same reference numbers in different drawings identify the same or similar elements. Also, the following detailed description does not limit the systems and methods described herein. Instead, the scope of the systems and methods are defined by the appended claims and their equivalents.

Figure 1:
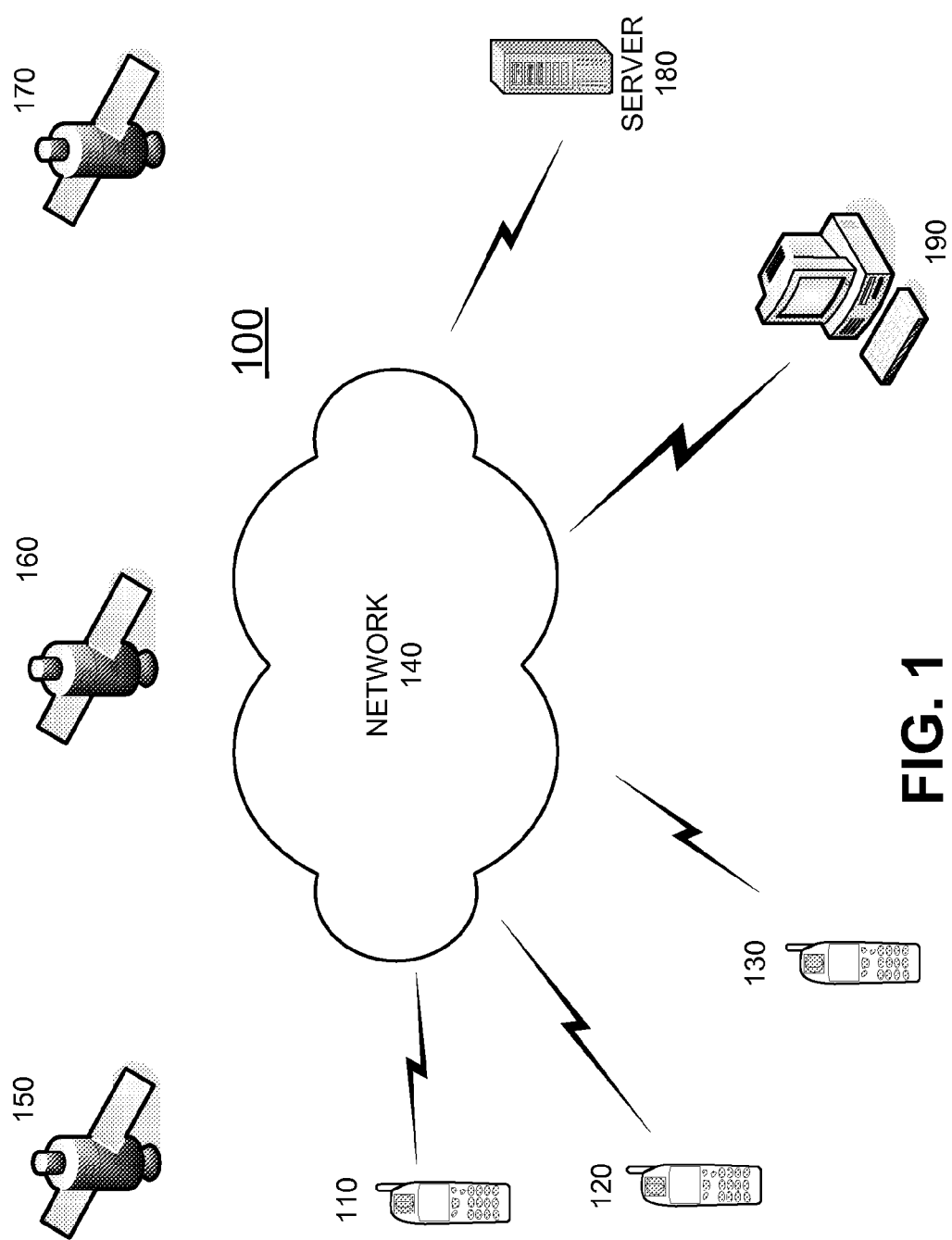
FIG. 1 is a diagram of an exemplary system in which methods and systems described herein may be implemented.

FIG. 1 is a diagram of an exemplary system 100 in which methods and systems described herein may be implemented.

System 100 may include mobile terminals 110, 120 and 130, network 140, GPS satellites 150, 160 and 170, server 180 and computer 190. It should be understood that system 100 may include other numbers of mobile terminals, GPS satellites, server and computers. System 100 may also include a number of base stations and base station antennas used to transmit information between mobile terminals 110-130.

The methods and systems described herein may be implemented in the context of a mobile terminal such as one or more of mobile terminals 110, 120 or 130. As used herein, the term "mobile terminal" may include a cellular radiotelephone with a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver, a radio (AM/FM) receiver; and a laptop and/or palmtop receiver or other appliance that includes a radiotelephone transceiver. Mobile terminals may also be referred to as "pervasive computing" devices that are capable of communicating with other devices via Short Messaging Service (SMS) protocols or other protocols that allow for simultaneous communications of voice, data, music and video information.

Network 140 may include one or more networks including a cellular network, such as a Global System for Mobile communications (GSM) network, a satellite network, the Internet, a telephone network, such as the Public Switched Telephone Network (PSTN), a metropolitan area network (MAN), a wide area network (WAN), or a local area network (LAN). Mobile terminals 110, 120 and 130 may communicate with each other over network 140 via wired, wireless or optical connections.

In an exemplary implementation, network 140 includes a cellular network used for transmitting data and messages between mobile terminals 110-130. For example, components of a cellular network may include base station antennas (not shown) that transmit and receive data from mobile terminals within their vicinity. Other components of a cellular network, for example, may also include base stations (not shown) that connect to the base station antennas and communicate with other devices, such as switches and routers (not shown) in accordance with known techniques.

GPS satellites 150, 160 and 170 may include a communication interface that may include any transceiver-like mechanism and one or more processors or microprocessors enabled by software programs and/or hardware to perform functions, such as transmission of GPS signals. GPS signals transmitted by GPS satellites 150-170 may be received by mobile terminals 110-130, and may be used to calculate the position of mobile terminals 110-130, for example.

Server 180 may include one or more processors or microprocessors enabled by software programs to perform functions, such as data storage and transmission, and interfacing with other servers (not shown), mobile terminals 110-130, network 140 and computer 190, for example. Server 180 may also include a data storage memory, such as a random access memory (RAM) or another dynamic storage device that stores information related to tracking mobile terminals 110-130, as described below.

Computer 190 may include one or more processors or microprocessors enabled by software programs to perform functions, such as data storage and transmission, codec conversion, and communications via network 140 with server 180 and communication devices 110-130, for example. Computer 190 may include software to enable communications over network 140 and/or the Internet. Computer 190 may also include a data storage memory, such as a random access memory (RAM) or another dynamic storage device that stores information. Computer 190 may also include a keyboard for entering data, a mouse for selecting data or pointing to data, and a CRT or flat panel display monitor. Computer 190 is shown as a personal computer (PC). Computer 190 may also include a laptop computer, PDA, mobile terminal, etc.

Figure 2:
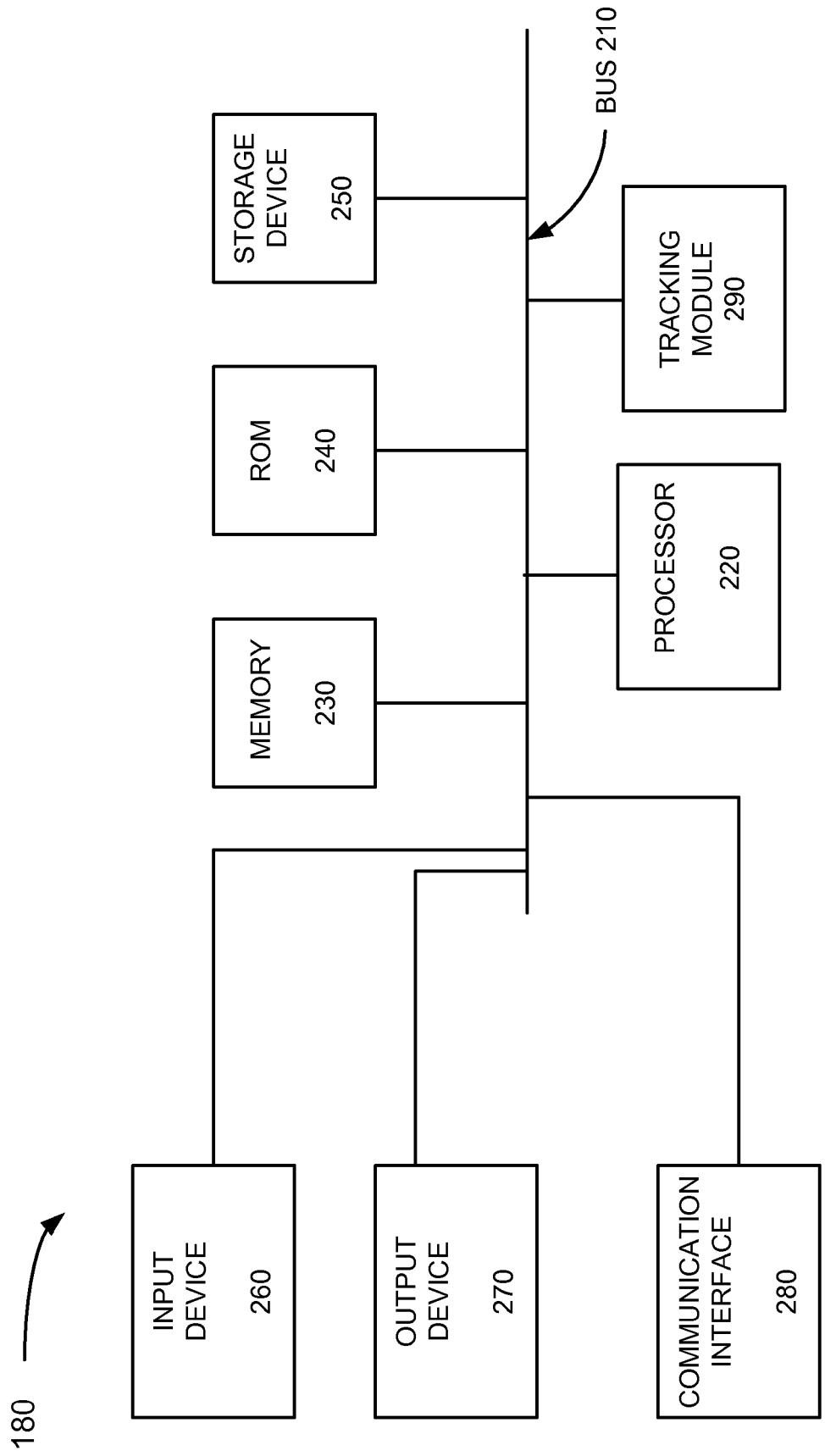
FIG. 2 is a diagram of an exemplary server of FIG. 1.

FIG. 2 is a diagram of an exemplary configuration of server 180. Server 180 may include bus 210, processor 220, a memory 230, a read only memory (ROM) 240, a storage device 250, an input device 260, an output device 270, a communication interface 280, and a tracking module 290. Server 180 may also include one or more power supplies (not shown). One skilled in the art would recognize that server 180 may be configured in a number of other ways and may include other or different elements.

Bus 210 permits communication among the components of server 180. Processor 220 may include any type of processor, microprocessor, or processing logic that may interpret and execute instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more mechanisms that permit a user to input information to server 180, such as a keyboard, a mouse, a microphone, a pen, voice recognition and/or biometric mechanisms, etc. Output device 270 may include one or more mechanisms that output information to the user, including a display, a printer, etc.

Communication interface 280 may include any transceiver-like mechanism that enables server 180 to communicate with other devices and/or systems. For example, communication interface 280 may include a modem or an Ethernet interface to a LAN. Communication interface 280 may include other mechanisms for communicating via a network, such as network 140. For example, communication interface 280 may include one or more radio frequency (RF) transmitters, and one or more RF receivers and antennas for transmitting and receiving RF signals.

Tracking module 290 may include hardware and/or software for tracking mobile terminals 110-130. For example, tracking module 290 may store information identifying mobile terminals 110-130 and may store information identifying a destination address of mobile terminals 110-130. Processor 220 and/or tracking module 290 may perform processing for receiving signals and tracking the position of mobile terminals 110-130. For example, processor 220 and/or tracking module 290 may receive signals relating to positions of mobile terminals 110-130 and generate maps and directions based on the tracked positions of the mobile terminals 110-130 and the position of the destination address. Tracking module 290 may also search the Internet to provide links related to the destination address, for example.

According to an exemplary implementation, server 180 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hardwired circuitry may be used in place of or in combination with software instructions to implement aspects of the embodiments. Thus, the systems and methods described herein are not limited to any specific combination of hardware circuitry and software.

Figure 3:
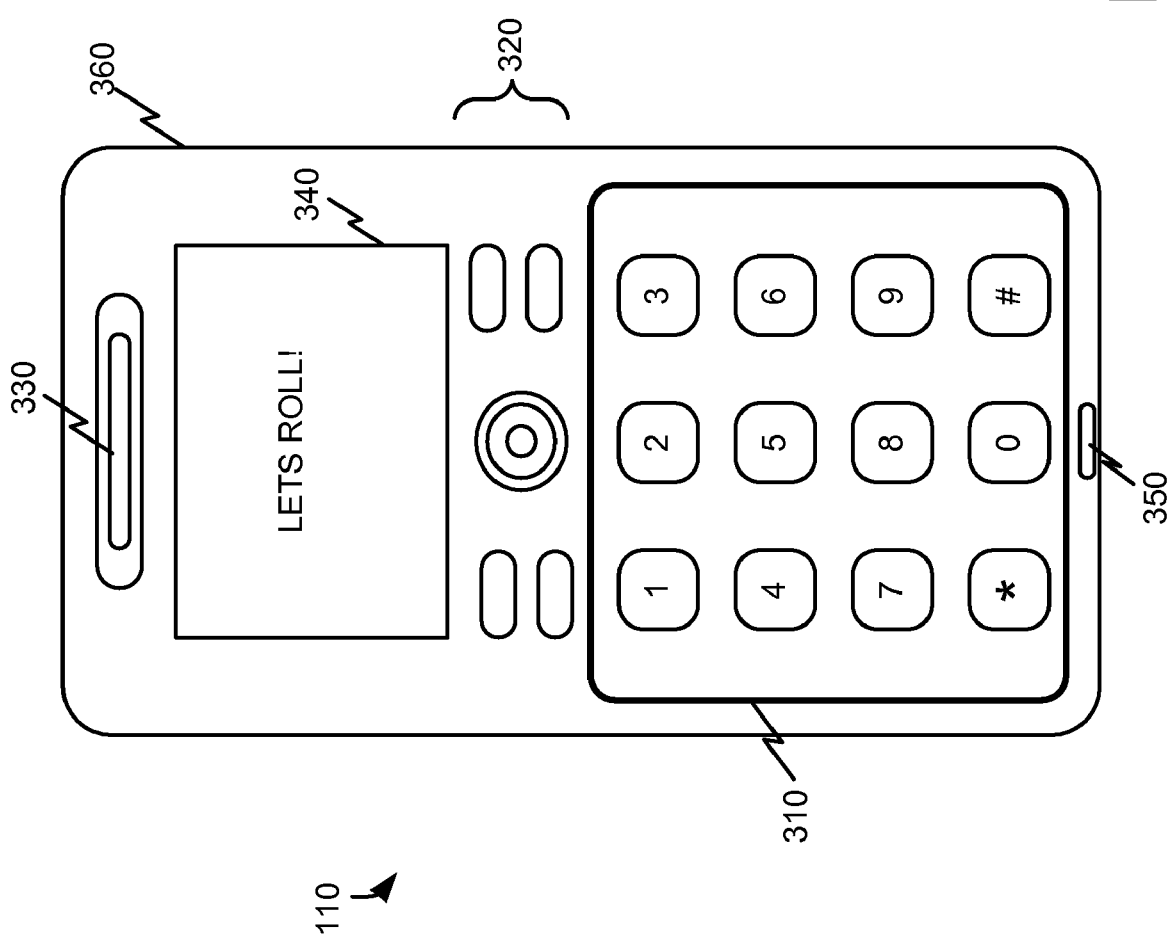
FIG. 3 shows an exemplary mobile terminal.

FIG. 3 shows an exemplary mobile terminal 110 that may include housing 360, keypad 310, control keys 320, speaker 330, display 340, and microphone 350. Housing 360 may include a structure configured to hold devices and components used in mobile terminal 110. For example, housing 360 may be formed from plastic, metal, or composite and may be configured to support keypad 310, control keys 320, speaker 330, display 340 and microphone 350.

Keypad 310 may include devices and/or logic that can be used to operate mobile terminal 110. Keypad 310 may further be adapted to receive user inputs, directly or via other devices, such as a stylus for entering information into mobile terminal 110. In one implementation, communication functions of mobile terminal 110 may be controlled by activating keys in keypad 310. Implementations of keys may have key information associated therewith, such as numbers, letters, symbols, etc. The user may operate keys in keypad 310 to place calls, enter digits, commands, and text messages into mobile terminal 110. Designated functions of keys may form and/or manipulate images that may be displayed on display 340.

Control keys 320 may include buttons that permit a user to interact with mobile terminal 110 to perform specified actions, such as to interact with display 340, etc. For example, a user may use control keys 320 to select from a menu of choices that may include selecting a choice to send or receive text messages to another mobile terminal, such as mobile terminals 120-130.

Speaker 330 may include a device that provides audible information to a user of mobile terminal 110. Speaker 330 may be located anywhere on mobile terminal 110 and may function, for example, as an earpiece when a user communicates using mobile terminal 110. Speaker 330 may also function as an output device for a playing music, or generating an alarm tone in an emergency, for example.

Display 340 may include a device that provides visual images to a user. For example, display 340 may display text to a user, such as a message "Let's Roll!" (as illustrated in FIG. 3). Display 340 may also display graphic information regarding incoming/outgoing calls, text messages, phonebooks, volume settings, etc., to a user of mobile terminal 110. Implementations of display 340 may be implemented as black and white or color displays, such as a liquid crystal display (LCD).

Microphone 350 may include a device that converts speech or other acoustic signals into electrical signals for use by mobile terminal 110. Microphone 350 may be located anywhere on mobile terminal 110 and may be configured, for example, to convert spoken words or phrases into electrical signals for use by mobile terminal 110.

Figure 4:
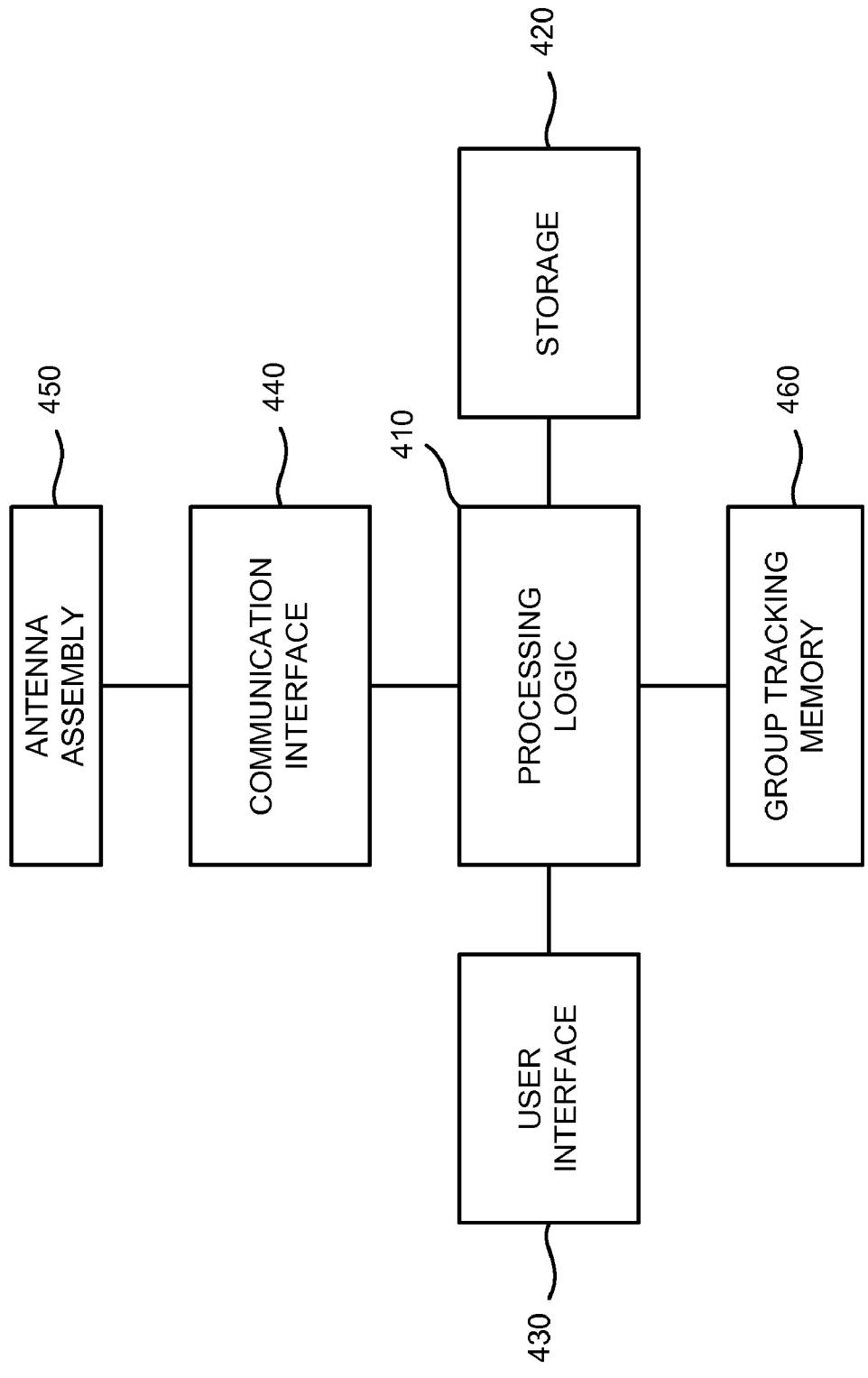
FIG. 4 is a diagram of an exemplary mobile terminal of FIG. 3.

FIG. 4 is a diagram of exemplary components of mobile terminal 110. As shown in FIG. 4, mobile terminal 110 may include processing logic 410, storage 420, user interface 430, communication interface 440, and antenna assembly 450, and group tracking memory 460. Processing logic 410 may include a processor, microprocessor, an application specific integrated circuit (ASIC), field programmable gate array (FPGA), or the like. Processing logic 410 may include data structures or software programs to control operation of mobile terminal 110 and its components. Storage 420 may include a random access memory (RAM), a read only memory (ROM), and/or another type of memory to store data and instructions that may be used by processing logic 410.

User interface 430 may include mechanisms for inputting information to mobile terminal 110 and/or for outputting information from mobile terminal 110. Examples of input and output mechanisms might include a speaker to receive electrical signals and output audio signals, a microphone to receive audio signals and output electrical signals, control buttons and/or keys on a keypad to permit data and control commands to be input into mobile terminal 110, and a display to output visual information.

Communication interface 440 may include, for example, a transmitter that may convert baseband signals from processing logic 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and reception of the RF signals. Communication interface 440 may also be configured to receive and process GPS signals from GPS satellites 150-170, for example. Antenna assembly 250 may include one or more antennas to transmit and receive RF signals and GPS signals over the air. Antenna assembly 450 may receive RF signals from communication interface 440 and transmit them over the air and receive RF signals over the air and provide them to communication interface 440.

Group tracking memory 460 may contain information relating to identifying mobile terminals in a group and may store information relating to a destination address for the group, for example. Group tracking memory 460 may also contain hardware and/or software for receiving and processing GPS signals in order to calculate a position of mobile terminal 110.

As will be described in detail below, mobile terminal 110 may perform operations in response to processing logic 410 executing software instructions to display and transmit/receive linked text messages to/from a group of mobile terminals, using an application contained in a computer-readable medium, such as storage 420. A computer-readable medium may be defined as a physical or logical memory device and/or carrier wave.

The software instructions may be read into storage 420 from another computer-readable medium or from another device via communication interface 440. The software instructions contained in storage 420 may cause processing logic 410 to perform processes that will be described later. Alternatively, hardwired circuitry may be used in place of or in combination with software instructions to implement processes consistent with the embodiments. Thus, implementations consistent with the principles of the embodiments are not limited to any specific combination of hardware circuitry and software.

FIG. 5 illustrates an exemplary contact list 500 consistent with the principles of the embodiments described herein. Contact list 500 may be stored on a computer-readable medium that stores information in a machine-readable format. In one implementation, contact list 500 may store information that is used to form a displayable list on display 340. Exemplary contact list 500 may be stored in storage 420 of mobile terminal 110, and may also be stored in tracking module 290 of server 180.

Contact list 500 may include a list of names, numbers and other information that may be arranged as individual entries (shown here as rows) that include fields (shown here in columns), such as a name field 510, a number or caller identifier (CID) field 520, and a group field 530. Information in contact list 500 may be arranged in any format.

Name field 510 may include information that identifies a user associated with a specific mobile terminal. The information in name field 510 may be entered by a user of mobile terminal 110 through a contact list menu for example, using keys on keypad 310. The names in name field 510 may be stored and displayed in alphabetical order, for example. Once a name is entered in name field 510, a user may save the name using control keys 320 and/or may be prompted to enter a phone number associated with the name. Also, for example, a number may be dialed or entered by a user of mobile terminal 110, and then the user may be automatically prompted to enter and save a name associated with the number in the contact list 500. In this example, a user may then enter a name that may be stored in name field 510 with the associated number in contact list 500.

Number field 520 may include information that identifies a phone number with an associated name in name field 510, for example. Number field 520 may include information, such as a phone number, an e-mail address, etc., that is uniquely associated with a mobile terminal, for example. The number stored in number field 520, for example, may also be referred to as a caller identifier (CID).

Group field 530 may include information that indicates that the user of the corresponding mobile terminal is in the "group." In one implementation, information in group field 530 may be text information, such as the word "Group." Group information may be dynamically changed by processing logic 410 in response to received inputs from keypad 310, for example. In addition, various different groups may be set up in contact list 500 and may be include different identifiers in group field 530, such as group 1, group 2, group 3, friends, family, guests, invitee, etc.

FIG. 6 illustrates an exemplary processing 600 performed by mobile terminal 110. Processing may begin, for example, by entering group information (act 610). For example, using keys on keypad 310, a user of mobile terminal 110 may enter parameters that relate to identification of mobile terminals in a group and information relating to a group destination address, for example. Assume, for example, a group of 3 people (each having one of mobile terminals 110-130) plan to travel together. In this case each user of mobile terminal 110-130, respectively, may enter information in their respective contact lists 500, identifying the other mobile terminals in the group. Alternatively, a user may select a pre-configured group of contacts stored in mobile terminal 110. Using keys on keypad 310, a user of mobile terminal 110 may access tracking module 290 in server 180, or a GPS tracking website, and enter information that may identify the mobile terminals in a group and may enter information relating to a group destination address. For example, a user of mobile terminal 110 may enter the phone numbers (CID) of each mobile terminal in the group and may enter a destination address for the group.

For example, if the users' of mobile terminals 110-130 plan to go Randi's Restaurant for happy hour, the address of Randi's may be entered by mobile terminal 110 (act 620). It should be understood that additional parties may be included in the group. For example, parties associated with two other mobile terminals may be included in this example. In other embodiments, a user of computer 190 may enter parameters that relate to identification of mobile terminals in a group and information relating to a group destination (act 620). For example, a user of computer 190 may access tracking module 290 in server 180, or a GPS tracking website, and may then enter the phone numbers (CIDs) of the mobile terminals in the group and may enter the destination address of the group.

Once group information has been entered, the mobile terminals in the group may be tracked (act 620). For example, mobile terminals 110-130 may begin to receive transmissions from GPS satellites 150-170 and may calculate their respective positions based on the received transmissions from GPS satellites 150-170. Mobile terminals 110-130 may then transmit their respective calculated positions to server 180, via network 140, for example. Server 180 may also calculate the positions of mobile terminals 110-130 using GPS signals forwarded from each mobile terminal 110-130. In still further embodiments, server 180 may receive GSM network signals from mobile terminals 110-130 in order to track and calculate the position of each of mobile terminals 110-130, for example. Server 180 may then use the calculated positions of each of the mobile terminals 110-130 and the determined destination position (destination address) to generate maps, directions, automatic messages and/or other information and/or links related to the destination of the group that may be of interest to the users of mobile terminals 110-130.

Figure 7A:
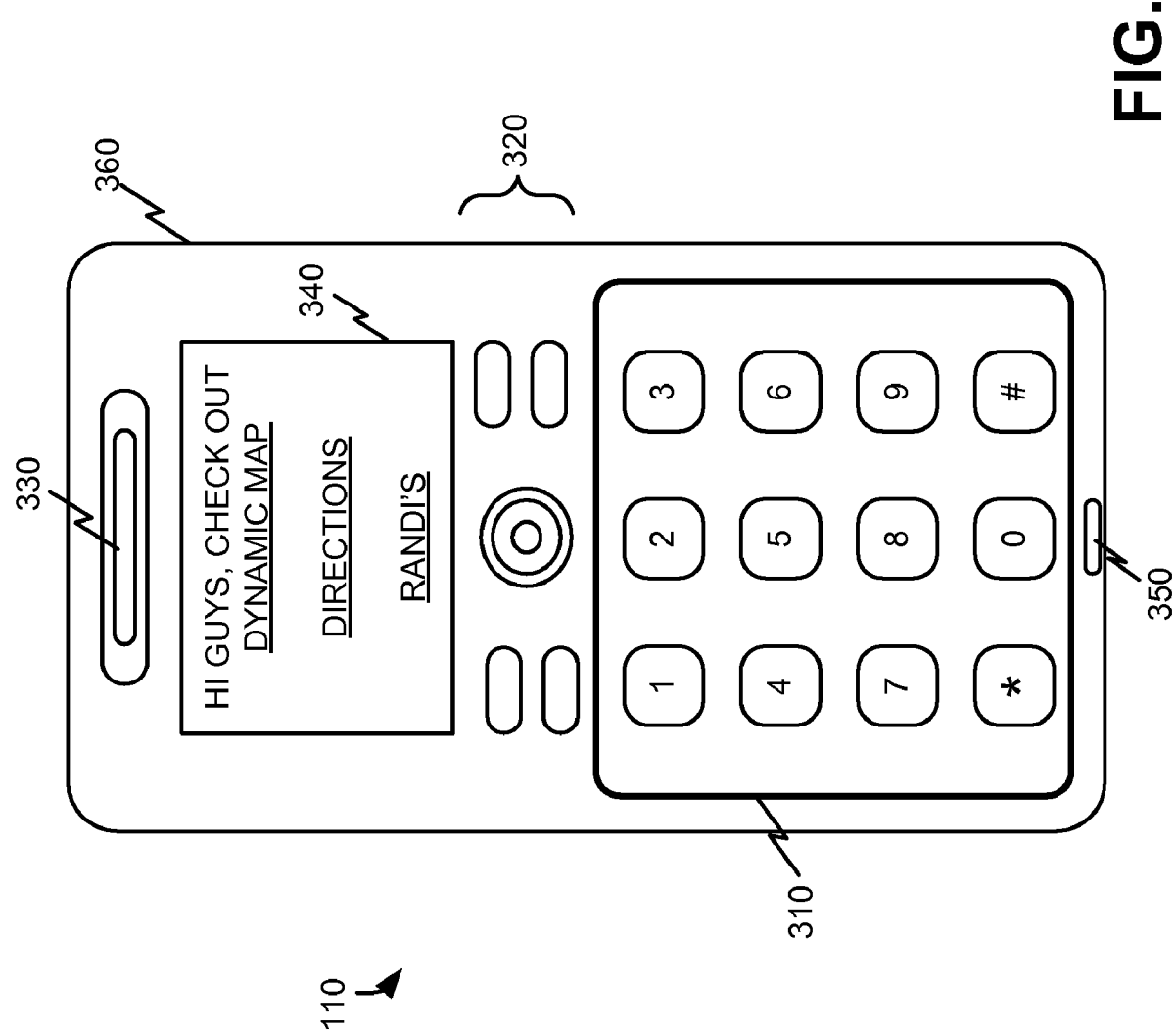
FIGS. 7A-7F illustrate exemplary displays on a mobile terminal.

While traveling to their destination, mobile terminals 110-130 may transmit and receive messages with one or more links (act 630). For example, using keys on keypad 310, a user of mobile terminal 110 may enter and send a text message, that may include links to GPS tracking websites, to other mobile terminals (e.g., 120-130) within the group (act 630). Similarly, mobile terminals 120 and 130 may also enter and transmit messages to the other mobile terminals in the defined group as stored in contact list 500, for example. The messages transmitted to/from mobile terminals 110-130 may be displayed via display 340. For example, FIG. 7A shows an exemplary text message received and displayed via display 340, on mobile terminal 110. In some other implementations, one or more of mobile terminals 110-130 may automatically send the messages to other mobile terminals in the group at predetermined intervals or may automatically send a message when two mobile terminals are within a predetermined distance of one another. In still other implementations, server 180 and/or GPS satellites 150-170 may automatically send messages to mobile terminals 110-130 indicating the position of mobile terminals in the group, such as via a map showing the geographical location of the mobile terminals, as described in more detail below.

Using control keys 320, for example, a user of mobile terminal 110 may scroll through, highlight and select a link within a message to activate the link (act 640). For example, the exemplary message in FIG. 7A may contain three links "Dynamic Map," "Directions" and "Randi's." A user of mobile terminal 110 may then highlight and select the displayed "Dynamic Map" link.

After selecting and activating a link, display 340 of mobile terminal 110 may display the linked information (act 650).

Figure 7B:
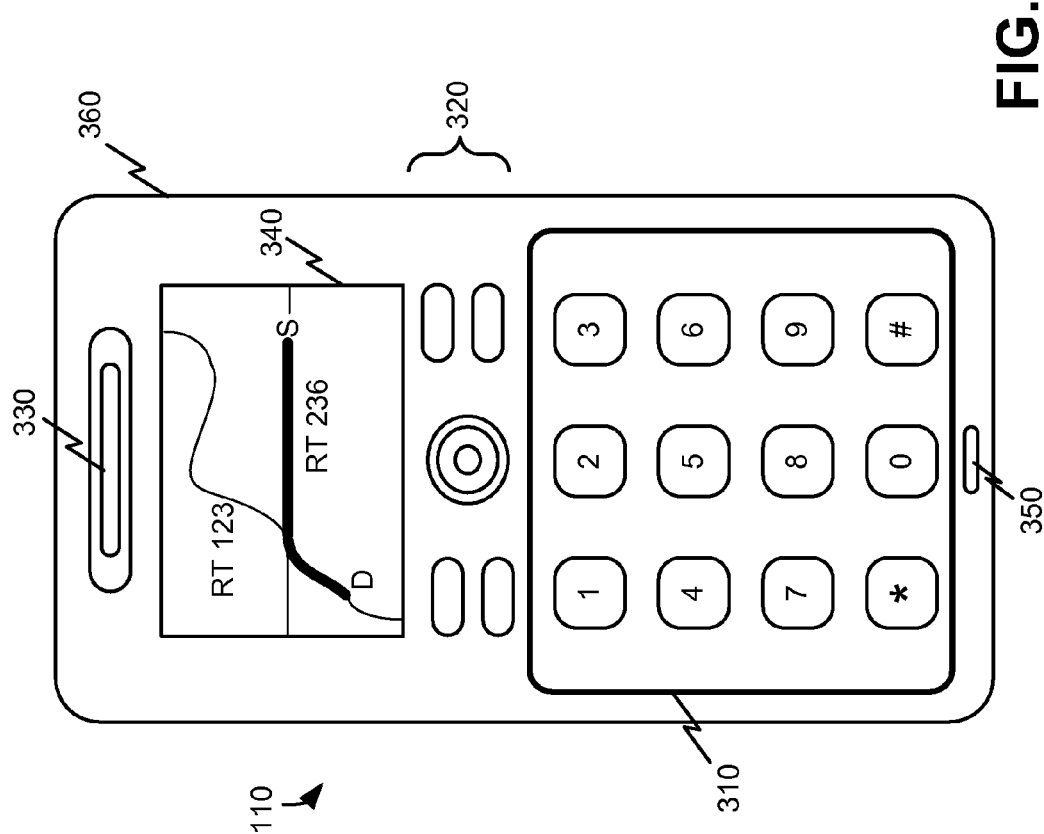

For example, tracking module 290 in server 180 may generate and transmit a map to mobile terminal 110, in response to mobile terminal 110 activating the "Dynamic Map" link. As shown in FIG. 7B for example, a map that includes the starting position "S" of mobile terminal 110, and the destination address or position "D" may be displayed, via display 340. In this example, a user of mobile terminal 110 may easily determine and confirm the route to their destination.

Figure 7C:
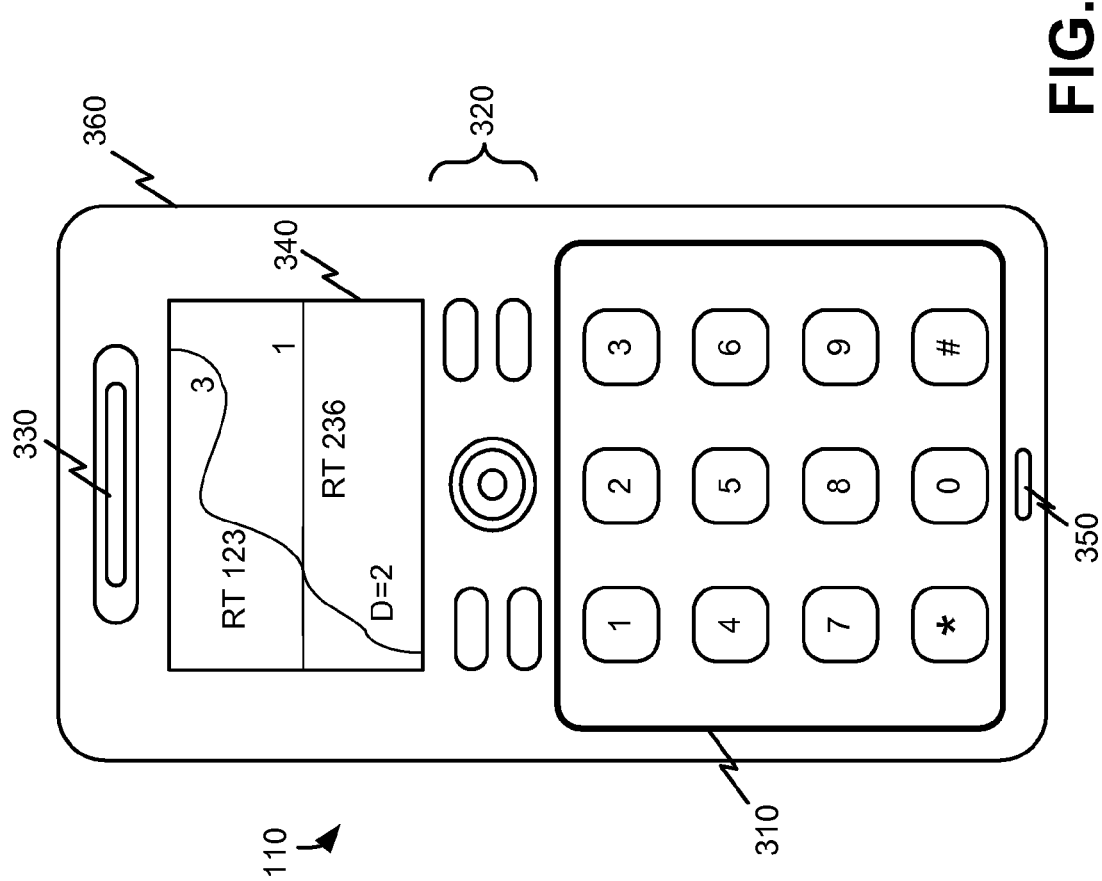

Another example of displaying linked information (act 650) is shown in FIG. 7C. In this example, display 340 shows a map of the position of all the mobile terminals 110-130 in the group, identified by "1," "2" and "3." For example, the position of mobile terminal 110 may be represented by "1," the position of mobile terminal 120 may be represented by "2" and the position of mobile terminal 130 may be represented by "3." In this example, mobile terminal 120 may be at the destination address (identified by "D=2"). In this example, all the mobile terminals in the group may see the respective positions of the other mobile terminals. In other embodiments, the exemplary message shown in FIG. 7A may have been transmitted from computer 190, which may be located at the destination address. In this example, a user of computer 190 may access the "Dynamic Map" link in the sent messages, to view a current position of each of the guests (e.g., users of mobile terminals 110-130), for example.

Figure 7D:
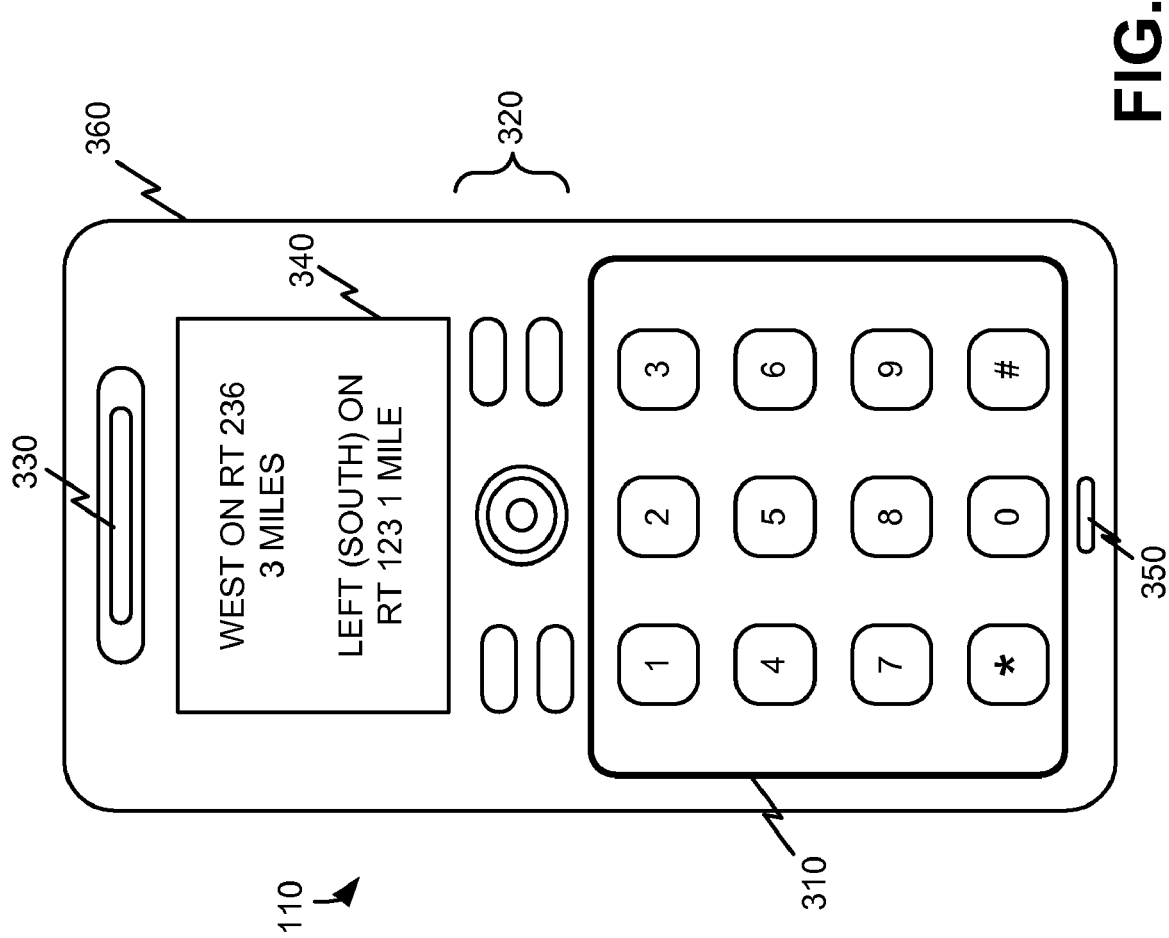

Another example of displaying linked information (act 650) is shown in FIG. 7D. In this example, directions to the destination address (Randi's) may be displayed to the user of mobile terminal 110. Tracking module 290 in server 180 may generate specific directions for each mobile terminal based on the calculated positions of mobile terminals 110-130 and the destination address position. The exemplary directions may be transmitted from server 180 to mobile terminal 110 in response to mobile terminal 110 activating the "Directions" link shown in FIG. 7A.

Figure 7E:
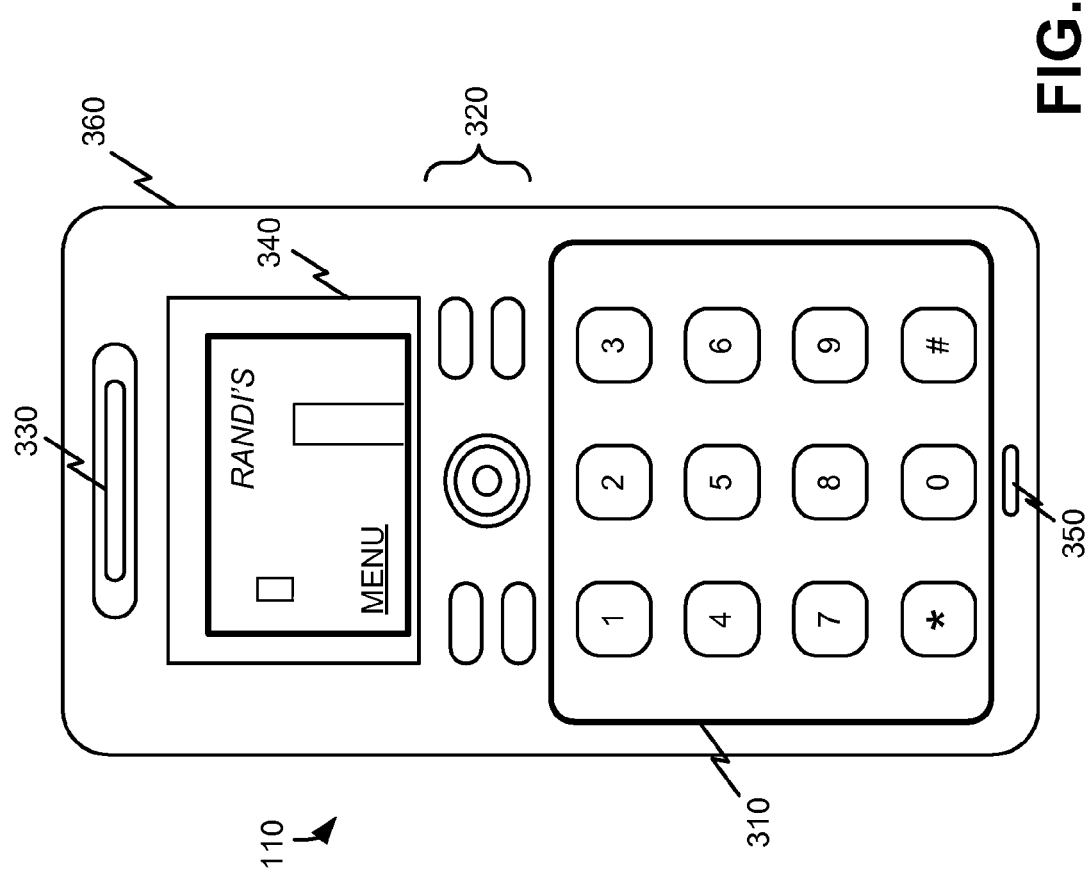

Another example of displaying linked information (act 650) is shown in FIG. 7E. In this example, the homepage for Randi's Restaurant may be displayed to the user of mobile terminal 110 after activating the "Randi's" link shown in FIG. 7A. In this example, the displayed information may include additional links, such as a "Menu" link, for example. In this example, a photo of the destination address may also be provided to help users of mobile terminals 110-130 to locate the destination location. In further embodiments, a message containing a photo of the destination address or additional links and/or information may be automatically transmitted (act 630) to a mobile terminal, such as one or more of mobile terminals 110-130 based on its calculated position. If, for example, tracking module 290 calculates the position of mobile terminal 110 to be within one mile of the destination address, a message may be sent including a link as shown in FIG. 7D, that may contain pictures of the destination address in order to help a user of mobile terminal 110 reach the destination address.

Figure 7F:
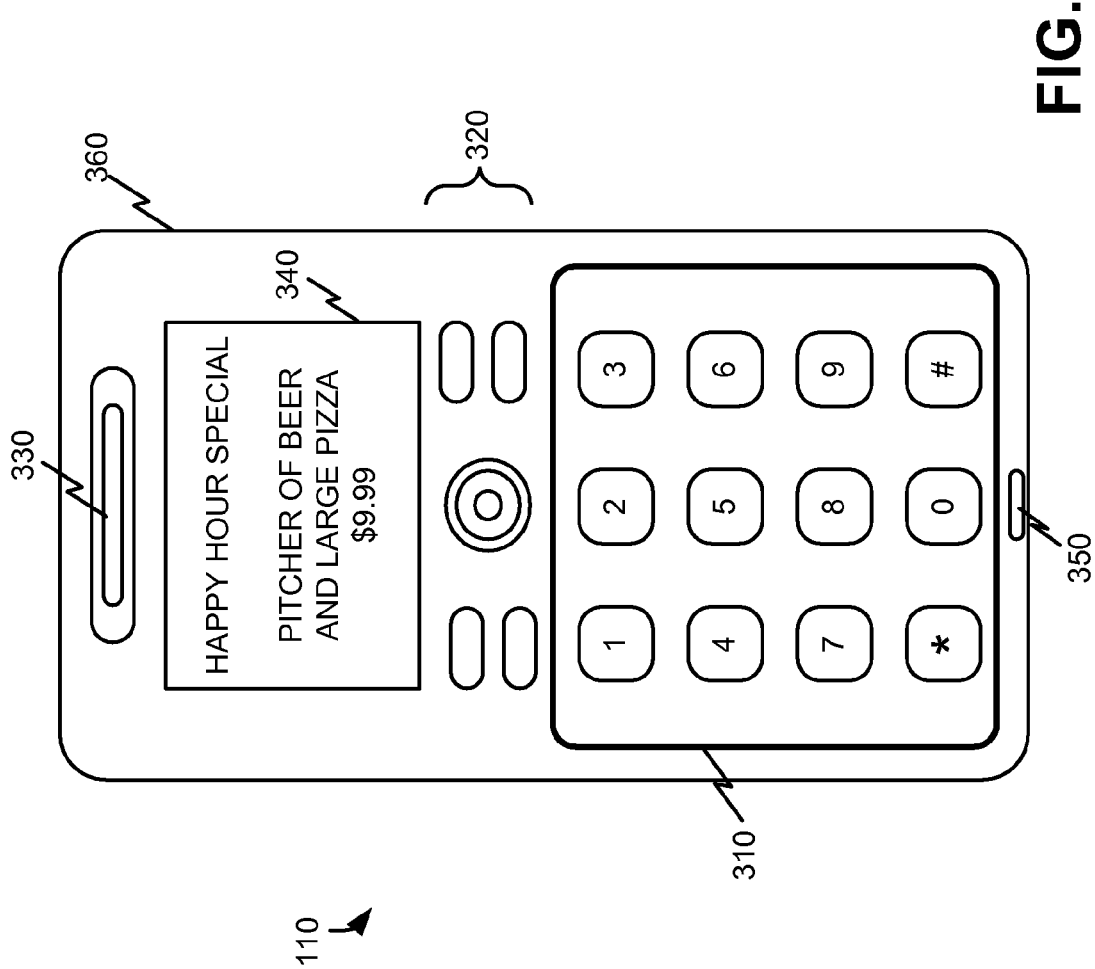

Another example of displaying linked information (act 650) is shown in FIG. 7F. In this example, the menu for Randi's Restaurant may be displayed to the user of mobile terminal 110 after activating the "Menu" link as shown in FIG. 7E. In this example, the displayed information may include a "Happy Hour Special Pitcher of Beer and Large Pizza $9.99." In this example, providing additional information via links related to the destination address, may aid users of mobile terminals 110-130 in decisions regarding their motivation to travel to the destination address.

CONCLUSION

Implementations consistent with the systems and methods described herein allow users of mobile terminals to transmit and receive messages, such as messages that my include location information, links to additional information, etc. These links may provide maps and information related to the position of the mobile terminals and information related to the destination of the mobile terminals.

The foregoing description of the embodiments provides illustration and description, but is not intended to be exhaustive or to limit implementations to the precise form disclosed. Modifications and variations are possible in light of the above teachings or may be acquired from practice of the implementations.

For example, the embodiments have been described in the context of a mobile terminals communicating over a network and employing GPS features. The embodiments may be implemented in other devices or systems and/or networks. In addition, in some embodiments, functions described above as being performed by server 180 may be performed by other devices, such as one of the mobile terminals.

Further, while series of acts have been described with respect to FIG. 6, the order of the acts may be varied in other implementations. Moreover, non-dependent acts may be performed in parallel.

It will also be apparent to one of ordinary skill in the art that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method performed by a mobile terminal, the method comprising:
   receiving information identifying a geographic location of each mobile terminal, in a group of mobile terminals;
   providing, to at least one mobile terminal, in the group of mobile terminals, a geographic location of a destination;
   calculating a distance between the geographic location of the at least one mobile terminal, in the group of mobile terminals, and the geographic location of the destination;
   identifying whether the calculated distance is less than or equal to a certain distance; and
   automatically generating and transmitting a message, containing a link to a document, to the at least one of the mobile terminals, in the group of mobile terminals, based on the calculated distance being less than or equal to the certain distance, where a content of the document is based on the calculated distance.

2. The method of claim 1, further comprising:
   inputting information identifying the group of mobile terminals.

3. The method of claim 2, where the message includes:
   a map that displays the geographic location of each of the group of mobile terminals.

4. The method of claim 1, where the message includes text.

5. The method of claim 4, where the message includes information related to the destination.

6. A mobile terminal, comprising:
   an input device for entering information identifying another mobile terminal and a destination address associated with a geographic location;
   a display; and
   logic to:
     receive a signal indicating a geographic location of the identified other mobile terminal,
     transmit the destination address associated with the geographic location to the other mobile terminal,
     calculate a distance between the geographic location of the other mobile terminal and the destination address associated with the geographic location;
     identify whether the calculated distance is less than or equal to a certain distance; and
     automatically generate and transmit a message, containing a link to a document, to the other mobile terminal, based on the calculated distance being less than or equal to the certain distance, where a content of the document is based on the calculated distance.

7. The mobile terminal of claim 6, where the logic is further to:
   receive information from the input device that identifies a group of mobile terminals.

8. The mobile terminal of claim 7, where the logic is further to:
   store the information that identifies the group of mobile terminals in a contact list.

9. The mobile terminal of claim 8, where the logic is further to:
   automatically transmit a text message to each one of the mobile terminals in the identified group of mobile terminals.

10. The mobile terminal of claim 7, where the logic is further to:
    receive and display a message that includes a link to a map displaying a geographic location of each of the mobile terminals in the identified group.

11. A method performed by a mobile terminal, comprising:
    identifying a group of mobile terminals;
    calculating a distance between the mobile terminal and at least one other mobile terminal in the group of mobile terminals;
    identifying whether the calculated distance is less than or equal to a certain distance;
    automatically generating, at a certain time interval, messages to the at least one other mobile terminal, in the group of mobile terminals, based on the calculated distance being less than or equal to the certain distance, where at least one of the messages contains a link to a document that is to be shared between the mobile terminal and the at least one other mobile terminal in the group of mobile terminals; and
    automatically transmitting the messages to the at least one other mobile terminal in the group of mobile terminals.

12. The method of claim 11, further comprising:
    identifying a destination address associated with the group of mobile terminals, where at least one message includes a map showing a geographic location of the destination address.

13. The method of claim 12, where the at least one message further includes directions to the destination address or provides a link to the directions.

14. The method of claim 12, where the at least one message further includes a link related to the destination address.

15. The method of claim 12, where the map further comprises:
    a display showing a geographic location of each of the mobile terminals in the group.

16. A method implemented by a server device, comprising:
    receiving identification information, identifying each mobile terminal in a group of mobile terminals, from a mobile terminal in the group of mobile terminals;
    receiving destination information, identifying a geographic location associated with a destination address, from the mobile terminal of the group of mobile terminals;
    monitoring a position of each mobile terminal, in the group of mobile terminals, based on the identification information;
    calculating a distance between the at least one mobile terminal, in the group of mobile terminals, and the geographic location associated with the destination address; and
    automatically sending a message, containing at least one link to at least one document, to the at least one mobile terminal, of the group of mobile terminals, based on a calculated distance, between the at least one mobile terminal, in the group of mobile terminals, and the geographic location associated with the destination address, being less than or equal to a certain distance, where a content of the at least one document is based on the calculated distance.

17. The method implemented by a server device of claim 16, where the message includes information relating to the destination address.

18. The method implemented by a server device of claim 16, where the message includes at least one image of the geographical location associated with the destination address.

* * * * *

UNITED STATES PATENT AND TRADEMARK OFFICE
CERTIFICATE OF CORRECTION

| | | |
|---|---|---|
| PATENT NO. | : 7,933,609 B2 | Page 1 of 1 |
| APPLICATION NO. | : 11/675736 | |
| DATED | : April 26, 2011 | |
| INVENTOR(S) | : Anna-Maria Lagerstedt et al. | |

It is certified that error appears in the above-identified patent and that said Letters Patent is hereby corrected as shown below:

Claim number 11, column 12, lines 12 through 15, delete the following text: "where at least one of the messages contains a link to a document that is to be shared between the mobile terminal and the at least one other mobile terminal in the group of mobile terminals"

Signed and Sealed this
Eighth Day of November, 2011

David J. Kappos
*Director of the United States Patent and Trademark Office*